United States Patent [19]

Hamada et al.

[11] Patent Number: 4,745,540
[45] Date of Patent: May 17, 1988

[54] PROCESS INPUT/OUTPUT SYSTEM

[75] Inventors: Akihide Hamada, Kawasaki; Keiichi Tomizawa, Hino, both of Japan

[73] Assignees: Fuji Electric Company Ltd., Kawasaki; Fuji Facom Corporation, Tokyo, both of Japan

[21] Appl. No.: 797,650

[22] Filed: Nov. 13, 1985

[30] Foreign Application Priority Data

Nov. 15, 1984 [JP] Japan .................................. 59-239339

[51] Int. Cl.$^4$ .......................... G06F 15/46; G06F 9/00
[52] U.S. Cl. ..................................... 364/140; 364/900
[58] Field of Search ... 364/200 MS File, 900 MS File, 364/140, 146

[56] References Cited

U.S. PATENT DOCUMENTS

| | | | |
|---|---|---|---|
| 4,415,965 | 11/1983 | Imazeki et al. | 364/900 |
| 4,425,630 | 1/1984 | Yomogida et al. | 364/900 |
| 4,602,325 | 7/1986 | Kurokawa | 364/900 |
| 4,608,661 | 8/1986 | Sasaki | 364/900 |

Primary Examiner—Eddie P. Chan
Attorney, Agent, or Firm—Spencer & Frank

[57] ABSTRACT

A process input/output system for a sequence controller includes integrally an input portion having a data reading portion for reading an external input signal from an external unit, an input control portion for judging an input condition of the external input signal from the read signal, and a first data memory for storing an input condition determined by the input control portion an output portion having a second data memory for storing output data inputted from a bus of the sequence controller to an external unit, and an output control portion for outputting the stored data to the external unit and holding the stored output data; a preset portion for presetting the selection of whether the unit is to be used as an input unit or as an output unit, the selection of the number of input terminals and output terminals and input response time; and a bus controlling portion for controlling the bus to perform exchanges of data between the first and second data memories and the bus, respectively. The system can respond flexibly according to the change of the input and/or output specifications or the specifications of the sequencer itself.

6 Claims, 12 Drawing Sheets

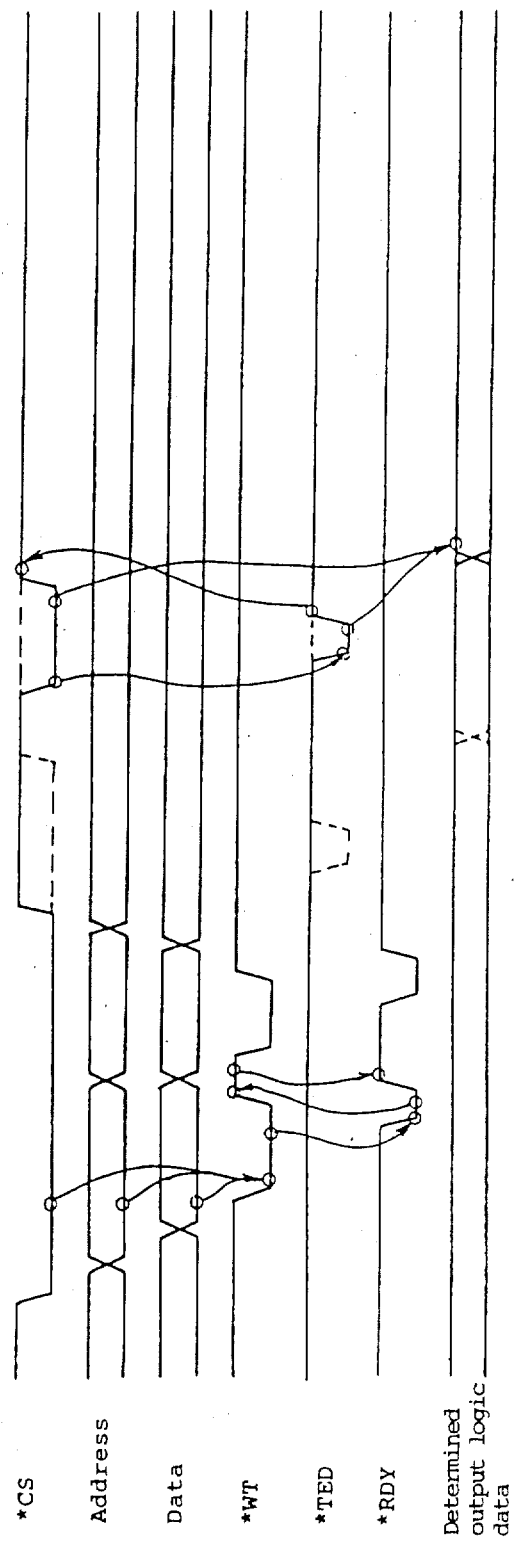

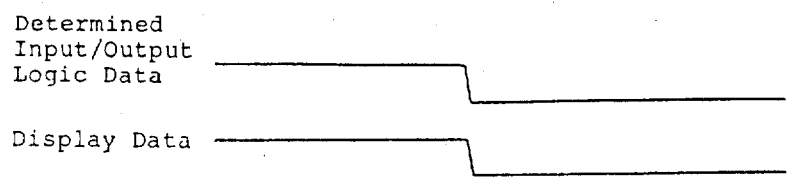
FIG. 12A
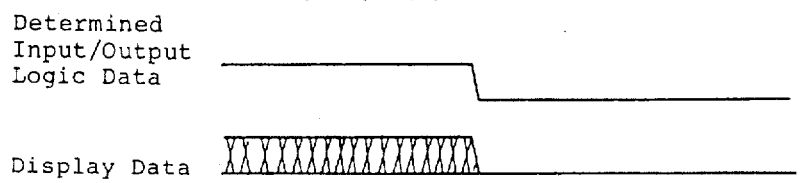
FIG. 12B
FIG. 13
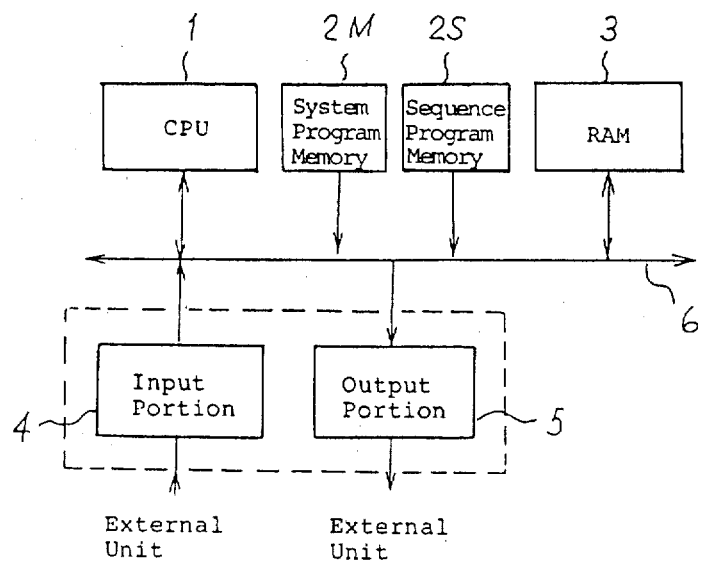
PRIOR ART

PRIOR ART

PROCESS INPUT/OUTPUT SYSTEM

BACKGROUND OF THE INVENTION

1. Field of the Invention

The present invention relates to a process input/output system, and more particularly to a process input/output system which is preferably used in a sequence controller or sequencer for controlling input and/or output in accordance with programs by a microcomputer.

2. Description of the Prior Art

FIG. 13 shows an example of the general arrangement of a prior art sequencer. In FIG. 13, reference numeral 1 denotes a central processing unit (CPU) in the form of a microprocessor. Reference numerals 2S and 2M denote memory portions, for storing sequence control command programs and system programs respectively. Reference numeral 3 denotes a memory portion having a random access memory (RAM). Reference numeral 4 denotes an input portion, reference numeral 5 denotes an output portion and reference numeral 6 denotes a bus.

Known circuits having discrete components and logic ICs may be used as the input portion 4 and the output portion 5 in this type of sequencer. The number of such circuits correspond to the number of inputs and outputs.

FIG. 14 and FIG. 15 show an example of an arrangement of such a conventional input portion and a conventional output portion, respectively. In these drawings, reference numerals 11 denote a terminals to be connected to an external apparatus, reference numerals 12a–12h denote resistors, reference numeral 13 denotes a capacitor, reference numeral 14 denotes a buffer, reference numeral 15 denotes a photo-coupler for insulating the sequencer electrically from the external apparatus, reference numeral 16 denotes a latch register, reference numeral 17 denotes a bus driver and reference numeral 18 denotes a transistor. Moreover, reference numerals B0–B7 denote bus signal lines, and *RD, *WT, *CS and *TED denote a data read signal, a data write signal, a bus selector signal and a data store signal, respectively, from the control portion 1.

This type of process input/output system for a sequencer has the disadvantage, however, that the number of components given by (the number of components per one input or output) X (the total number of inputs and outputs) is needed. Accordingly, if the number of inputs and/or outputs is increased, the volume of the system expands and the cost increases. Moreover, there is the disadvantage that it is not easy to determine circuit constants when designing a sequence controller.

SUMMARY OF THE INVENTION

It is, therefore, an object of the present invention to provide a process input/output system for a sequencer in which the disadvantages of the prior art are eliminated, and which can respond flexibly according to changes of the input and/or output specifications or when the specifications of the sequencer itself are changed.

In order to achieve the above objects, a process input/output system for a sequence controller in accordance with the present invention comprises:

an input means having means for reading in an external input signal from an external unit, means for judging an input condition of the external input signal from the read signal, and a first storage means for storing an input condition determined by the judging means;

an output means having a second storage means for storing output data inputted from a bus of the sequence controller to an external unit, and means for outputting the stored data to the external unit and holding the stored output data;

means for presetting the selection between the input means and the output means, the selection of the number of inputs and outputs and a response time; and means for controlling the bus to perform exchanges of data between the first storage means and the second storage means and the bus, respectively.

The input means and the output means can have first and second display means for displaying the determined input condition and the determined output condition, respectively. The presetting means may preset display conditions of the first and second display means.

The controlling means may include means for eliminating noise which occurs on the bus.

The above and other objects, effects, features and advantages of the present invention will become more apparent from the following description of preferred embodiments thereof taken in conjunction with the accompanying drawings.

BRIEF DESCRIPTION OF THE DRAWINGS

FIG. 11 is a timing chart showing operation timings during data output in the processing shown in FIG. 8;

FIGS. 12A and 12B are timing charts showing two examples of a display timing in a display portion in the system shown in FIG. 2;

FIG. 13 is a block diagram showing an example of the general arrangement of a prior art sequencer.

DETAILED DESCRIPTION OF PREFERRED EMBODIMENTS

Figure 1:
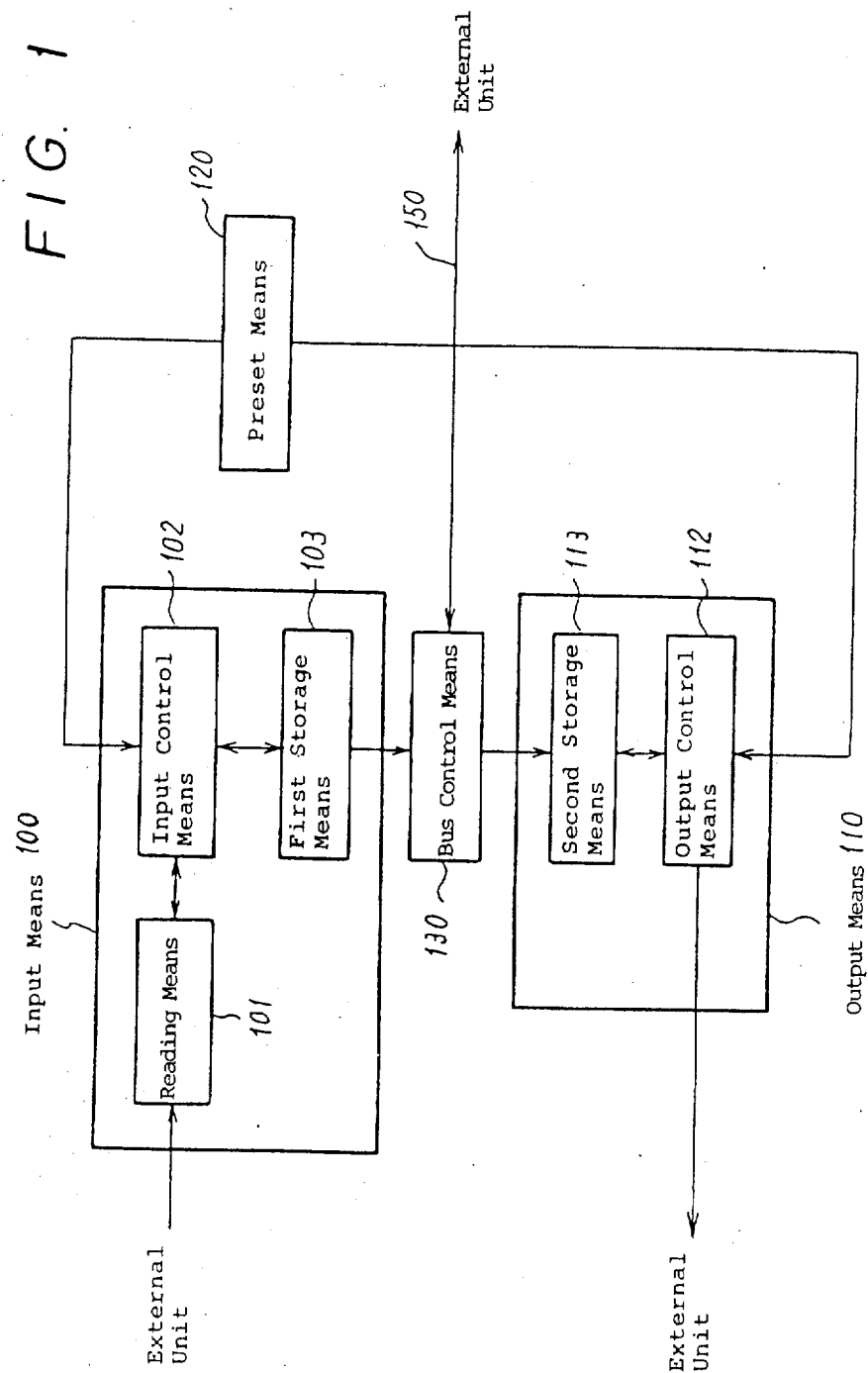
FIG. 1 is a block diagram showing the fundamental arrangement of a process input/output system according to the present invention.

FIG. 1 shows an embodiment of a basic arrangement of a process input/output system according to the present invention. The process input/output system according to the present invention comprises an input means 100 having a reading means 101 for reading a signal input from an external unit, an input control means 102 for judging an input condition of an external input signal from the read signal and a first storage means 103 for storing the input condition determined from the judging. The process input/output system additionally comprises an output means 110 having a second storage means 113 for recording data to be fed to an external unit inputted from a sequence controller bus 150 and an output control means 112 for outputting the stored data to be fed to the external unit and for holding the data. The process input/output system further comprises a preset means 120 for presetting the selection between the above-mentioned input means 100 and output means 110, selection of the number of inputs and outputs and an input response time, and a bus control means 130 for controlling the bus 150 to exchange data between the first storage means 103 and the second storage means 113 and the bus 150, respectively.

The preset means 120 presets the selection of input and output, the number of inputs and outputs and the response time. The input control means 102 performs input filtering with respect to external input signals according to this setting, verifies or determines the input condition and stores the results in the first storage means 103. The stored data is thus outputted to the bus 150 by the bus control means 130.

The output control means 112 inputs the data on the bus 150 through the bus control means 130 and stores that data in the second storage means 113, so that the data is outputted to an external unit and also held in the bus control means 112. This arrangement allows for a flexible response to changes in the specifications of the input/output system, and permits a reduction in the number of components.

Figure 2:
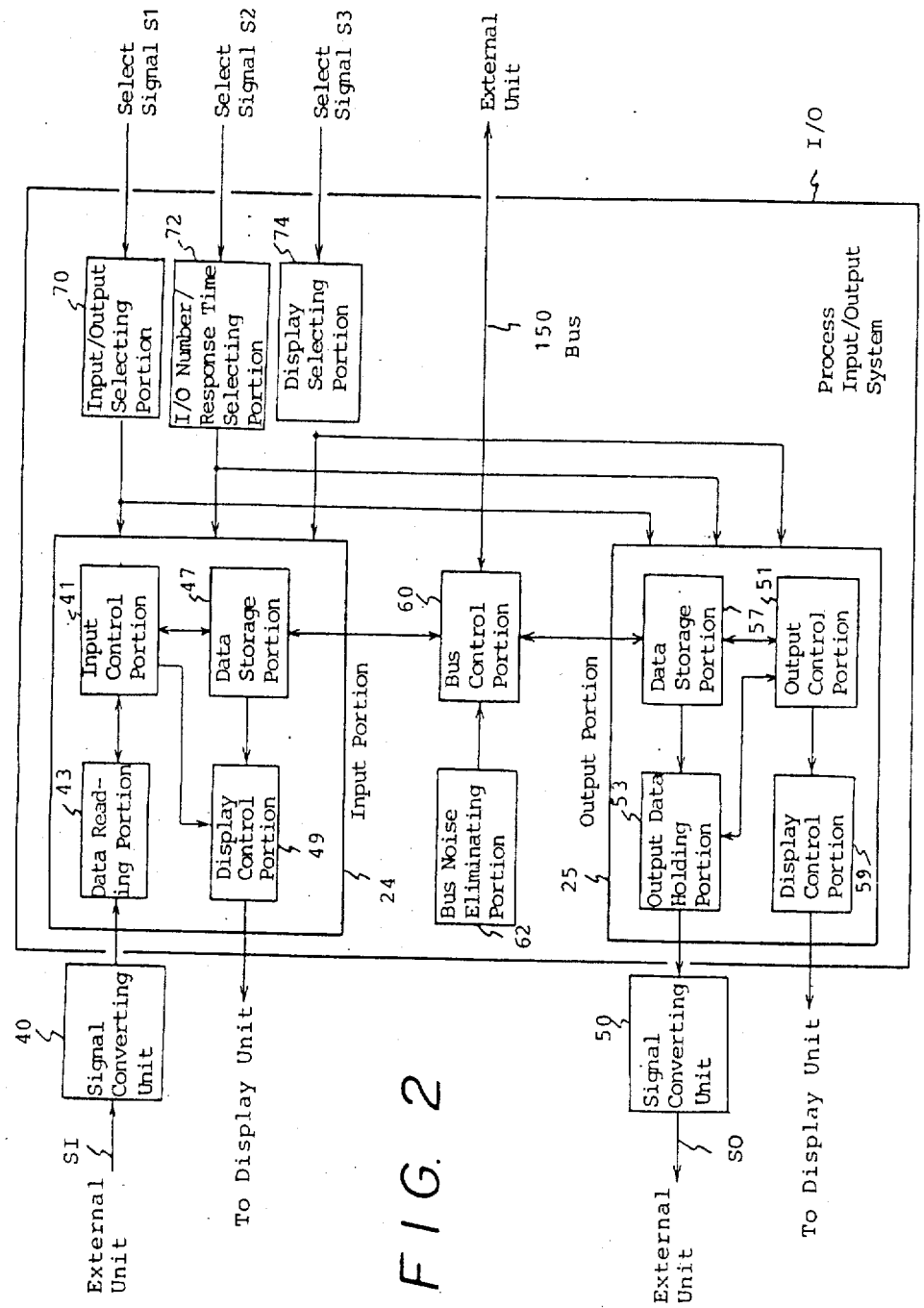
FIG. 2 is a block diagram showing a more detailed embodiment of a process input/output system according to the present invention.

FIG. 2 shows an embodiment of a more detailed arrangement of a process input/output system according to the present invention. Reference numerals 24 and 25 denote an input portion and an output portion in the form of a microcomputer, respectively. These portions 24 and 25 correspond to the input means 100 and the output means 110 in FIG. 1, respectively. The input and output portions 24 and 25 perform setting of input functions and output functions according to a select signal S1 from a sequence control portion 1 (see FIG. 13), respectively, and also perform setting of the number of inputs and outputs and the response time according to a select signal S2, respectively.

In the input portion 24, reference numeral 41 denotes an input control portion for controlling the portions within the input portion 24, and for performing a processing program described later with reference to FIG. 5, FIG. 6 and FIG. 8. Reference numeral 43 denotes a data reading portion for reading an input signal SI from an external unit and for storing the read data. Here, the input signal is first converted into a digital signal matched to the devices inside the sequencer by a signal converting portion 40, and then the converted signal is applied to the data reading portion. The input control portion 41 judges an input condition of the input signal SI in accordance with a processing program to be described later with reference to FIG. 6 in response to the read signal stored in the data reading portion 43. Furthermore, the input control portion 41 has a working memory area to be used during that judging processing. Reference numeral 47 denotes a data storage portion such as a buffer for storing input data (determined or verified input logic data) determined by the input control portion 41. A portion of the memory area of the data storage portion 41 can be assigned to the working memory area for the input control portion 41. Reference numeral 49 denotes a display portion for displaying the determined input logic data.

In the output portion 25, reference numeral 51 denotes an output control portion for controlling the portions within the output portion 25, and for performing a processing program to be described later with reference to FIG. 10 and FIG. 8. This output portion 25 is arranged as a portion of the output control means 112 (FIG. 1) together with a data output/storing portion 53. Reference numeral 57 denotes a data storage portion such as a buffer for storing an operating signal transmitted through the bus 150 which is to be outputted to an external unit. Reference numeral 53 denotes the data output/holding portion for outputting and holding that signal stored in the buffer portion 57 through a signal converting portion 50 to an external unit as an operating signal SO. Reference numeral 59 denotes a display portion for displaying that output data (determined output logic data).

The combination of a bus control portion 60 and a bus noise eliminating portion 62 correspond to the bus control means 130 in FIG. 1. Here, the bus control portion 60 controls the bus 150 to perform the transmission of various control signals to the input portion 24 and the output portion 25 and the selection of input and output data. The bus noise eliminating portion 60 eliminates noise which occurs on the bus 150.

Reference numeral 70 denotes an input/output selecting portion for executing the functions of the input portion 24 and the output portion 25 in accordance with the select signal S1. Reference numeral 72 denotes a number/response time selecting portion for setting the number of inputs and outputs and for setting the response time in accordance with the select signal S2. Reference numeral 74 denotes a display selecting portion for displaying contents according to a display select signal S3 on a display unit (not shown). These portions 70, 72 and 74 correspond to the preset means 120 in FIG. 1.

The process input/output apparatus I/O shown in FIG. 2 can be formed by two LSIs, for example, type MB88421 LSIS manufactured by Fujitsu. The two LSIs mainly correspond to the input and output portions 24 and 25, respectively, and incorporate the remaining portions 60 and 62 and 70, 72 and 74 therein.

Figure 3:
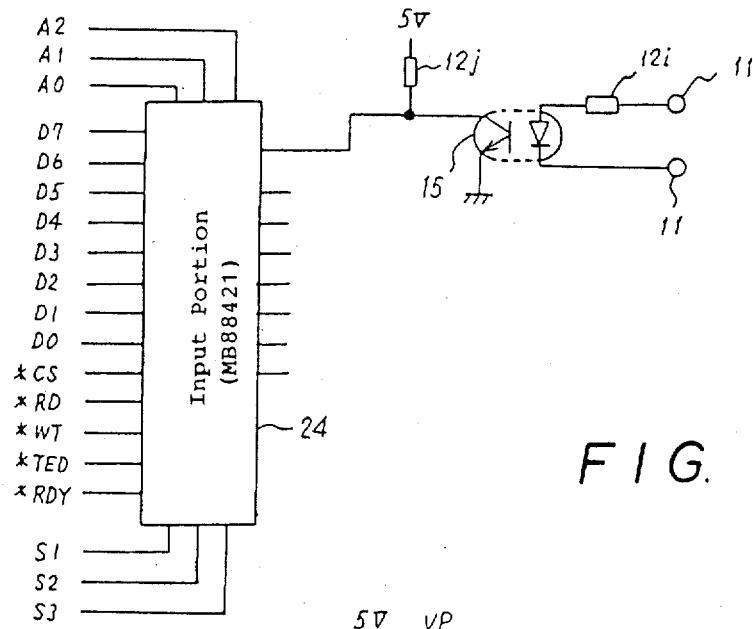
FIGS. 3 and 4 are circuit diagrams showing connections for the input portion and the output portion of the system shown in FIG. 2, respectively.
Figure 4:
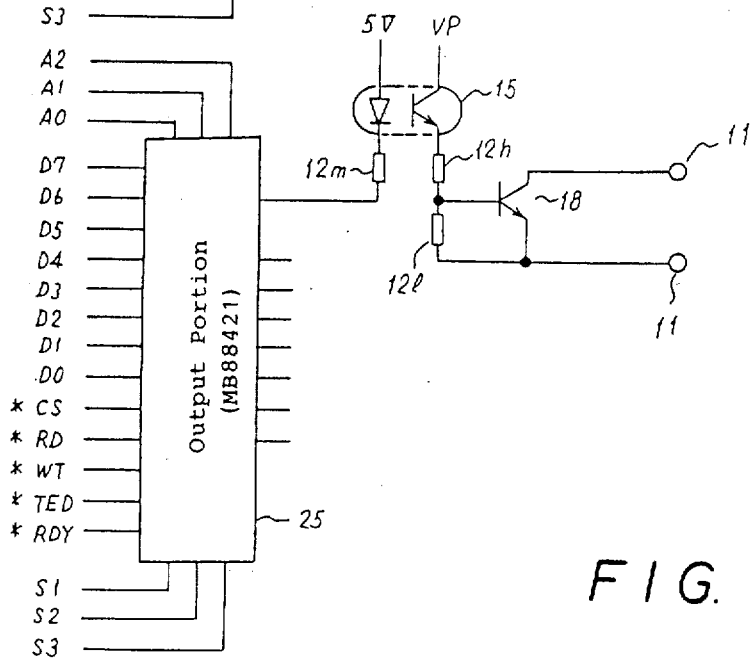
Figure 14:
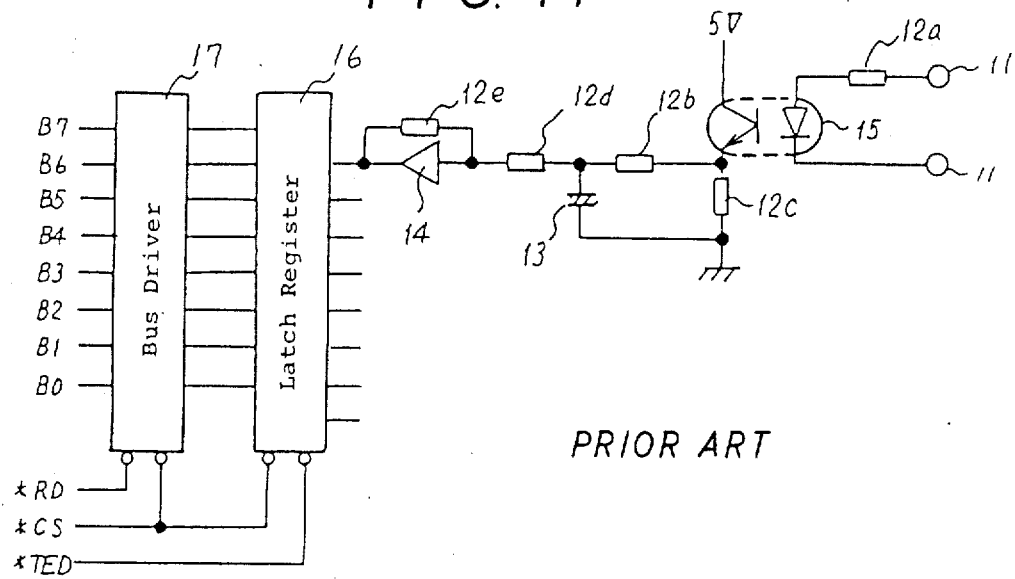
FIGS. 14 and 15 are circuit diagrams showing arrangments of a conventional input portion and a conventional output portion, respectively.
Figure 15:
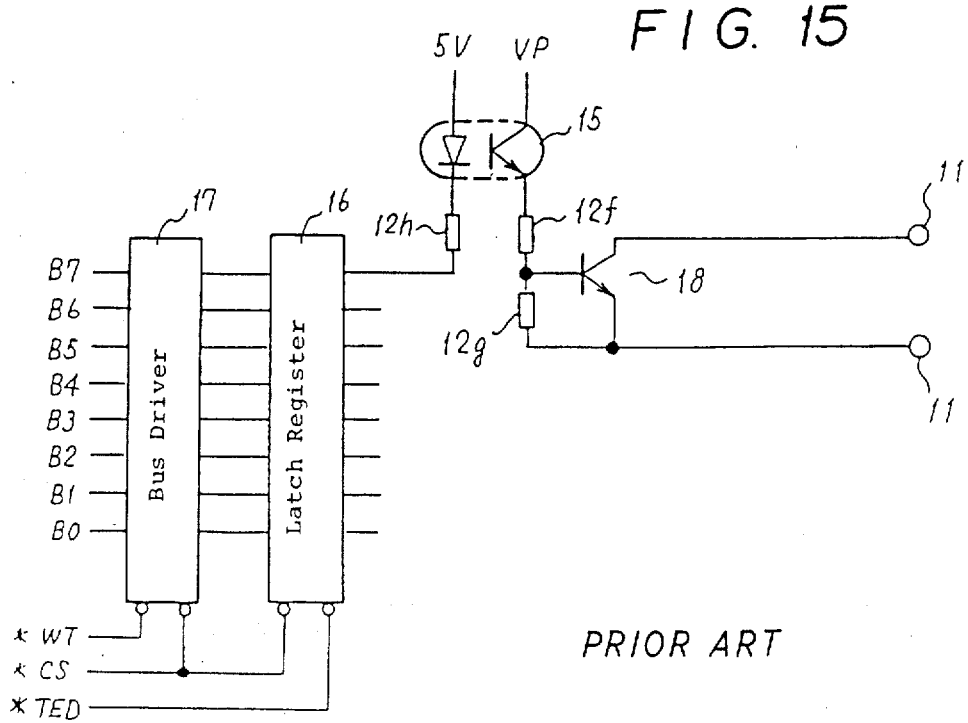

This arragement is shown in FIGS. 3 and 4, which show the input portion 24 and the output portion 25, respectively, each formed by an LSI, MB88421, and the connections to and from external units and the various signals. The reference numbers or symbols here are the same as are applied to the corresponding portions in FIG. 14 and FIG. 15. Reference numerals A0–A2 denote address signals, reference numerals D0–D7 denote data signals, *CS denotes a bus select signal, *TED denotes a data holding signal, *RD denotes a data read signal, *WI denotes a data write signal, and *RDY denotes a data synchronizing signal outputted by the input portion 24 or the output portion 25 to the control portion 1. Each of these signals is connected through the bus 150.

Figure 5:
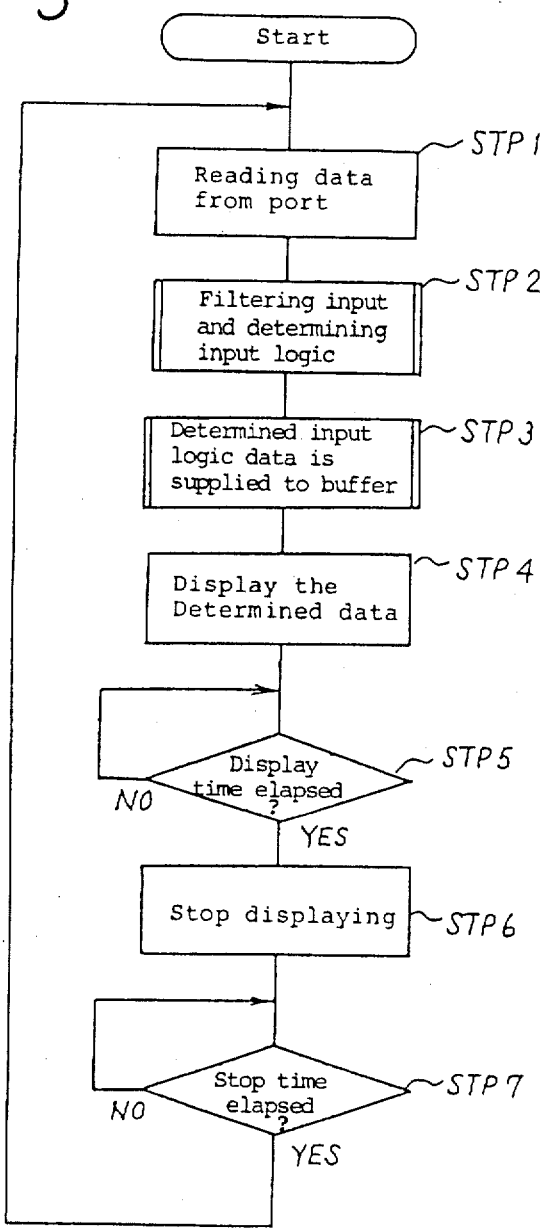
FIG. 5 is a flowchart showing an example of an input processing procedure by the input portion.

FIG. 5 outlines an example of the external signal input processing procedure performed by the input portion 24. The procedure is triggered by the select signals S1–S3 from the control portion 1. First, at step STP1, an input signal is read from the input port. Next, at step STP2, as will be explained with reference to FIG. 6, filtering of the input signal is performed by judging the input logic of the input data, so that the input logic is determined. At step STP3, the determined data is stored into the data storage portion 47, so that the transmission of the determined input data to the control portion 1 is processed as will be described with reference to FIG. 8. At steps STP4 and STP5, the determined input data is displayed, and after a predetermined display time has elapsed, the display is stopped at step STP6. After the display stop time has elapsed at STP7, the procedure returns to step STP1, and repeats the input processing procedure.

Figure 6:
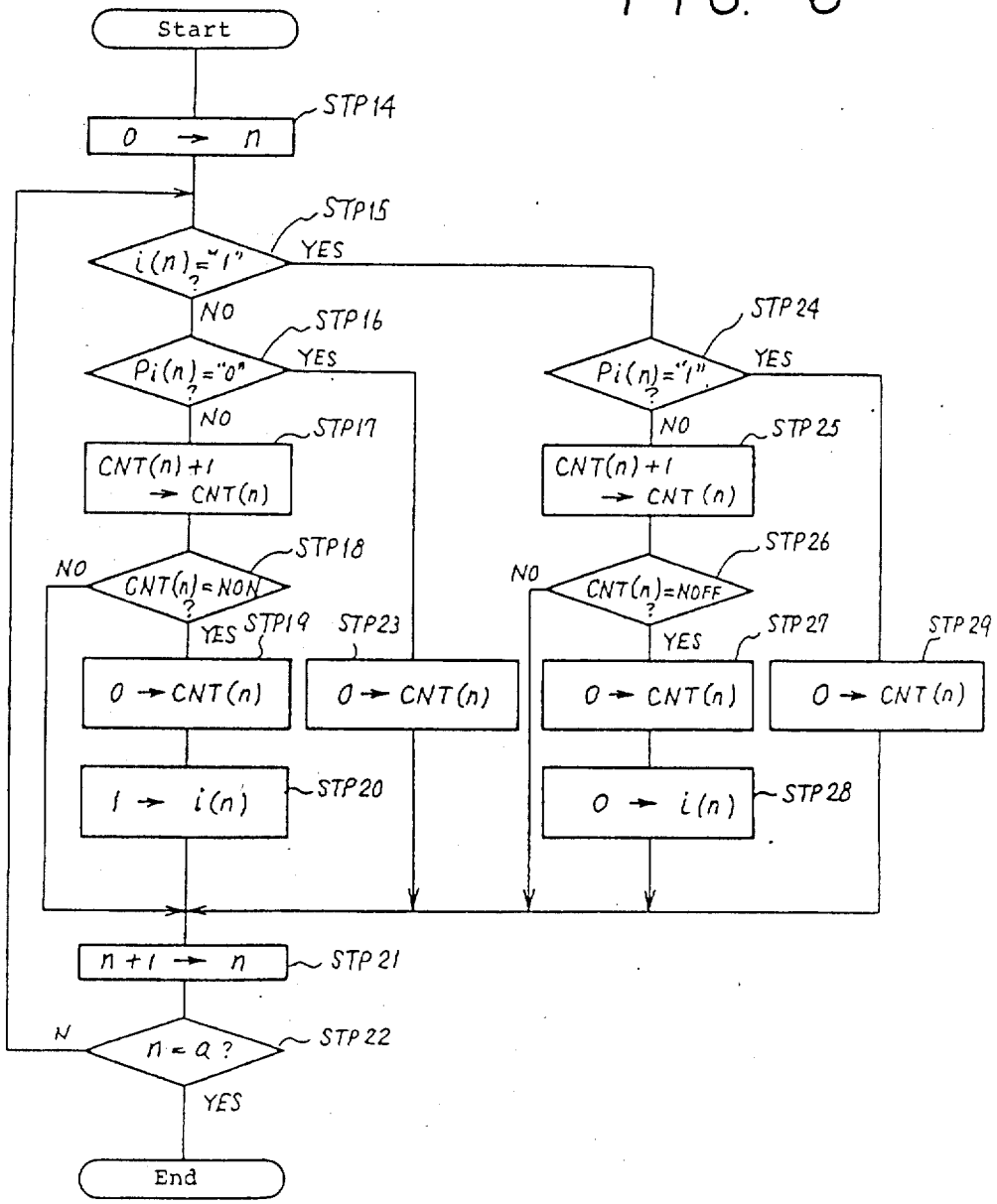
FIG. 6 is a flowchart showing an example of an input logical verification procedure by the input portion.

FIG. 6 shows an example of the details of the input logic judging procedure in step STP2. In FIG. 6, the symbols i(0)-i(n) denote determined input logic data and correspond to the 0th-nth bits of an input signal, respectively. These data are stored in the data storage portion 47. The symbols Pi(0)-Pi(n) denote data inputted from the port of the input portion 24 and correspond to the symbols i(0)-i(n). These data Pi(0)-Pi(n) are stored in the working memory area of the storage portion 47. The symbols CNT(0) - CNT(n) denote contents of the counters for judging input logic which are located in this working memory area and correspond to i(0)-i(n), respectively. NOFF indicates a judging preset value for input logic "0", and NON indicates a judging preset value for input logic "1". These preset values are stored in the work memory area according to the select signal S2.

Figure 7:
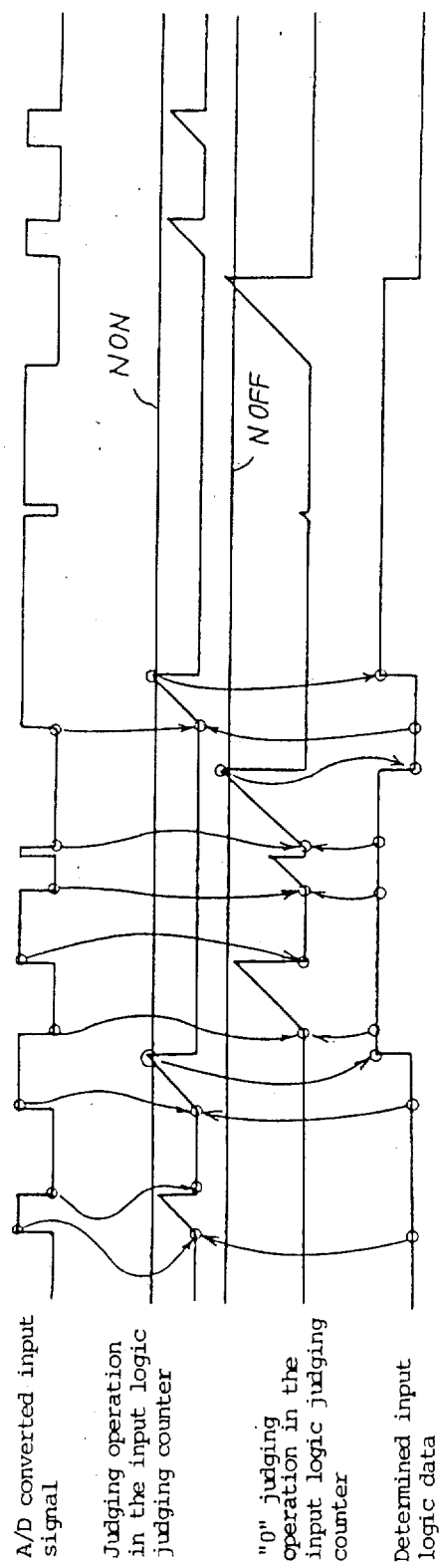
FIG. 7 is a timing chart showing operation timings in the processing shown in FIG. 6.

FIG. 7 shows operating timings according to the processing procedure in FIG. 6. An explanation will be made of the processing procedure in FIG. 6 with reference to this timing chart. First, at step STP14 the input logic judging counter n which shows the bit series of the input is processed for the nth bit (0≦n≦a, where a is a predetermined value). As to the nth bit of a given input signal, when the input signal shown in FIG. 7 is inputted to the input portion 24, the present condition of i(n) is judged, and the next logic judging operation is selected at step STP15. When i(n)="0" at step STP15, judging processing for logic "1" is performed at step STP16. That is, the present condition of Pi(n) is judged at step STP16. If Pi(n)=i(n), then CNT(n)=0 at step STP23. If Pi(n)≠i(n), it is determined that there is the possibility that the condition of logic might change with respect to the present i(n), and 1 is added to CNT(n) at step STP17. Then, at STP18 it is judged whether CNT(n)=NON. If CNT(n)<NON, then n is incremented by +1 at step STP21. Subsequently, the procedure from step STP22 to Step STP22 is repeated, until the value of n reaches a, each time that the latest Pi(n) is set. If CNT(n)=NON at step STP18, it is deemed that the input logic is changed and CNT(n) is cleared to zero at step STP19. Then, i(n) is rendered to "1" at step STP20. In this processing, the response time of logic "1" of the input system is determined by NON.

Next, when i(n)="1" at step STP15, the procedure proceeds to step STP24 to perform the judging processing for logic "0". In step STP24, if Pi(n)=i(n)="1", CNT(n) is rendered to "0" at step STP29, like the judging processing for logic "1". If Pi(n)≠i(n)=1, 1 is added to CNT(n) at step STP25. Then, if CNT(n)<NOFF, the procedure through steps STP26, STP21, STP22, STP15, STP24 and STP25 is repeated, each time that the latest Pi(n) is set. If CNT(n)=NOFF at step STP26, i(n) is rendered to "0" and the logic changes at steps STP27 and STP28. In this case, the response time for logic "0" of the input system is determined by NOFF. The processing procedure described above performs the filtering of the input signal to produce determined input logic data.

Further, it is also possible to perform the input filtering by using two or more counters.

Figure 8:
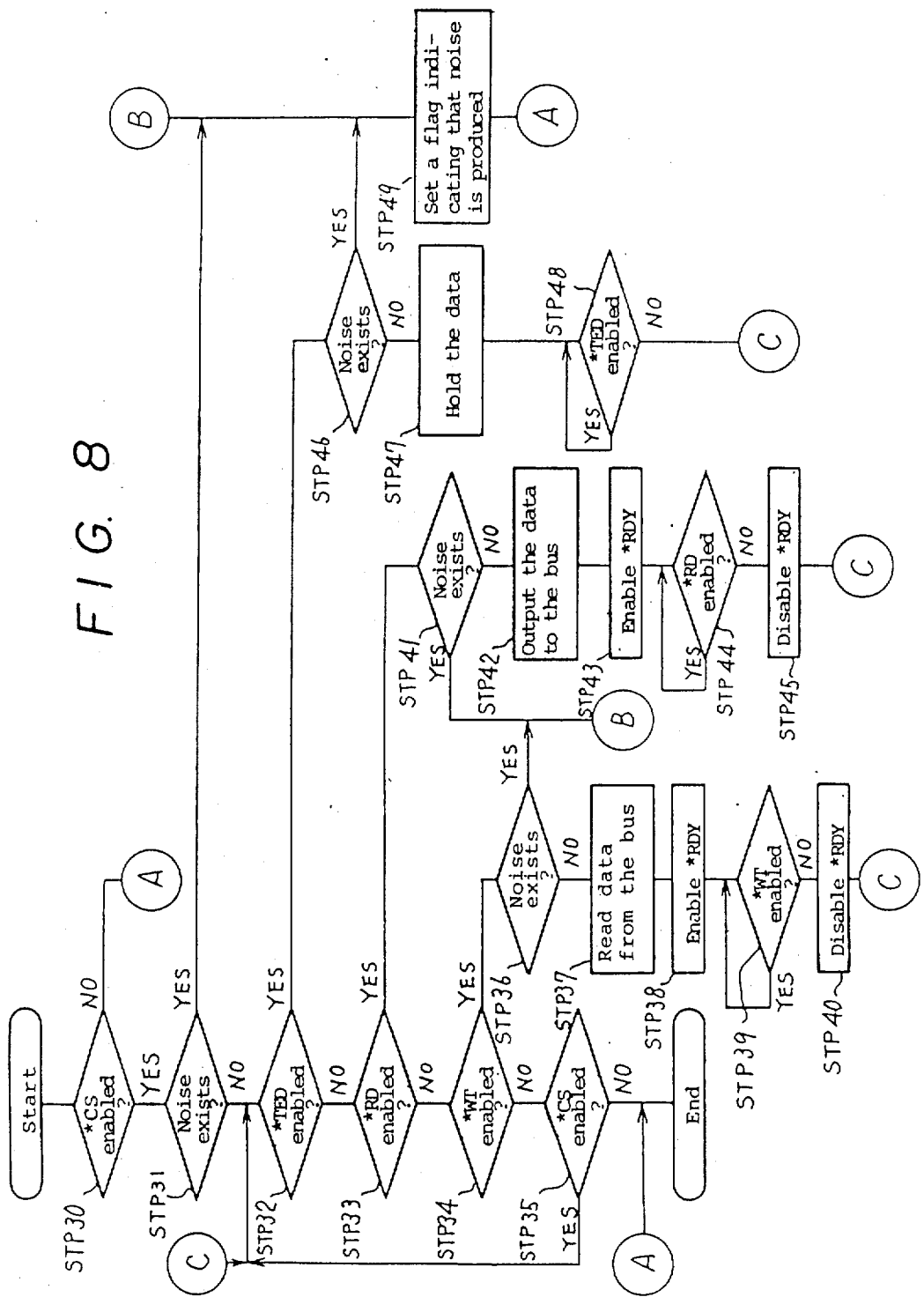
FIG. 8 is a flowchart showing an example of a data receive processing procedure by the process input/output system shown in FIG. 2.
Figure 9:
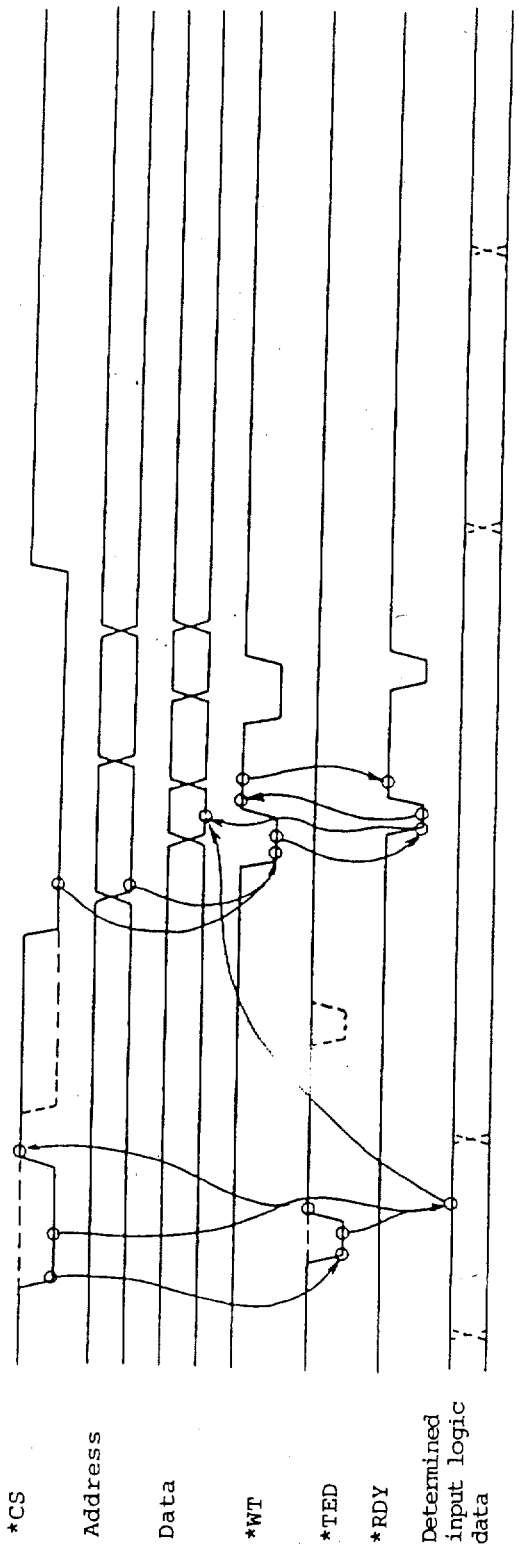
FIG. 9 is a timing chart showing operation timings during data input in the processing shown in FIG. 8.

The following processing is performed when the control portion 1 desires to read the determined input logic data obtained in this manner FIG. 8 shows an example of a processing procedure for exchanging data between the input/output system I/0 and the control portion 1. When the control portion 1 connected to the bus 150 requests an input data, the control portion 1 follows the operating timings shown in FIG. 9, so that the bus select signal *CS and the data holding signal *TED are enabled. In response to this enabling procedure, the input portion 24 stores the determined input logic data at steps STP30-STP32, and steps STP46-STP48. Subsequently, the control portion 1 enables the bus select signal *CS, the address signals A0-A2 and the data read signal *RD. Then, the input portion 24 outputs the stored data to the data lines D0-D7 and enables the data synchronizing signal *RDY at steps STP30-STP33 and STP41-STP45. The control portion 1 waits for the *RDY signal to be enabled, and then reads the data and disables the signals *CS, A0-A2 and *RD. When noise is detected at step STP31, STP41 or STP46, that fact is indicated by setting an alarm flag at step STP49.

Next, an explanation will be made of the output processing for producing control signals to be supplied to an external unit.

Figure 10:
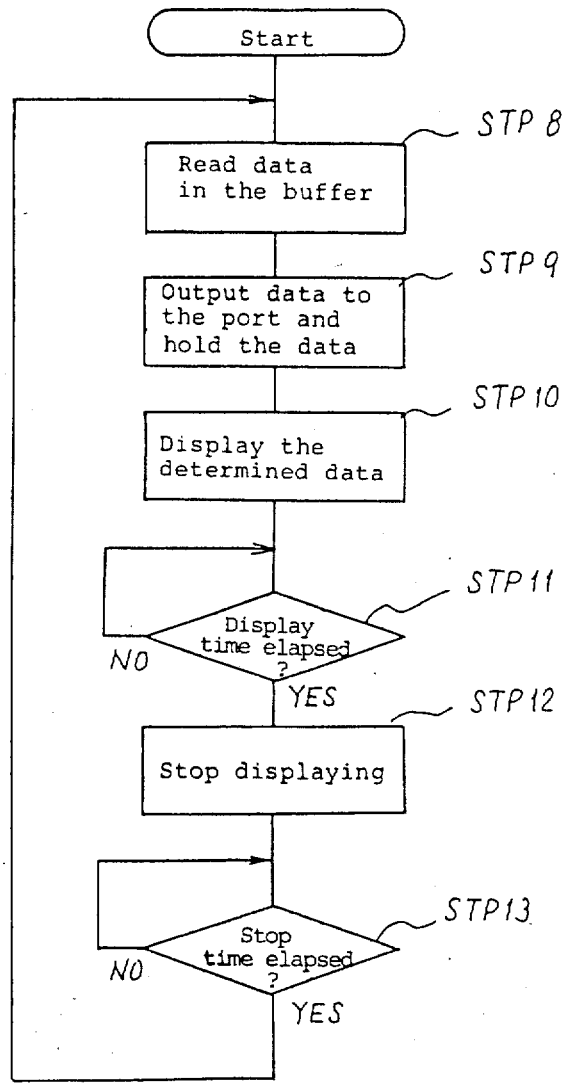
FIG. 10 is a flowchart showing an example of an output processing procedure by the output portion.

FIG. 10 outlines an example of the output processing procedure performed by the output portion 25. This processing is triggered by the signals S1-S3. First, at step STP8 the output data stored in the buffer or storage portion 57 from the bus 150 is read out, and then at step STP9 the data output/holding portion 53 outputs the data, and also holds that data. After the determined output logic data is displayed for the display time at steps STP10 and STP11, the display is de-energized at steps STP12 and STP13, so that the processing returns to step STP8.

The processing for outputting data to an external unit at steps STP8 and STP9 is performed as shown in FIG. 8. That is, in accordance with the operating timings shown in FIG. 11, the control portion 1 enables the signals *CS, the addresses A0-A2, the data lines D0-D7 and the data write signal *WT, so that the output portion 25 reads the data on the data lines D0-D7 and enables the data synchronizing signal *RDY through steps STP30-STP40 so as to synchronize the output portion 25 with the control portion 1. As to the processing to hold the data, when the control portion 1 enables the signals *CD and *TED next time, the output portion 25 holds the data read by the above-mentioned processing, and makes the data to be determined output logic data.

As shown in FIG. 12A and FIG. 12B, the display processing in FIG. 5 and FIG. 10 selects either FIG. 12A or FIG. 12B according to the preset condition of the signals S1-S3, allowing for display in accordance with the input logic and output logic thus preset.

If the display format is selectable in this manner, it is possible to select required input and output logics depending on the application field of the sequence controller, so that the power consumption can be reduced.

As explained above, a process input/output system according to the present invention permits flexible response to an external unit, so that the number of circuit components can be greatly reduced, thereby permitting a reduction in volume and realization of an inexpensive construction of the system. Furthermore, the input filter for judging the input logic can be modified by software processing, thereby facilitating changes in the circuit constants required by changes in design specifications.

What is claimed is:

1. A process input/output unit for a sequence controller comprising:
   an input means having input terminals and means for reading an external input signal received via said input terminals from an external unit;
   an output means having a first storage means for storing output data inputted from a bus of said sequence controller, which is to be outputted to said external unit or another external unit, output terminals, and means for outputting said stored data to said external unit or said another external unit via said output terminals;
   presetting means connected to said input means and said output means and responsive to select signals for presetting selection of either one of said input means and said output means which is to be in use, the number of said input terminals and the number of said output terminals and input response time corresponding to said input signals;
   said input means further having judging means for performing input filtering with respect to said external input signals according to the setting that was preset by the presetting means and for determining an input condition of an external input signal that has been read by the means for reading, and a second storage means for storing said input condition determined by said judging means; and
   means for controlling said bus to perform exchanges of data from said second storage means to said bus and from said bus to said first storage means, said input means, said output means, said presetting means, and said means for controlling being integrally arranged as one unit.

2. A process input/output unit for a sequency controller as claimed in claim 1, wherein said input means and said output means have first and second display means for displaying said determined input condition and said stored data outputted from said means for outputting, respectively.

3. A process input/output unit for a sequence controller as claimed in claim 2, wherein said presetting means presets display conditions of said first and second display means.

4. A process input/output unit for a sequence controller as claimed in claim 1, wherein said controlling means includes means for eliminating noise which occurs on said bus.

5. A process input/output unit for a sequence controller as claimed in claim 2, wherein said controlling means includes means for eliminating noise which occurs on said bus.

6. A process input/output unit for a sequence controller as claimed in claim 3, wherein said controlling means includes means for eliminating noise which occurs on said bus.

* * * * *